US011971692B2

(12) United States Patent
Zhang et al.

(10) Patent No.: US 11,971,692 B2
(45) Date of Patent: *Apr. 30, 2024

(54) SYSTEMS AND METHODS FOR VIRTUAL COMMISSIONING OF BUILDING MANAGEMENT SYSTEMS

(71) Applicant: Johnson Controls Tyco IP Holdings LLP, Milwaukee, WI (US)

(72) Inventors: Xin Zhang, Hartland, WI (US); Bryan A. Register, Brookfield, WI (US); Matthew P. Kaiser, Milwaukee, WI (US); Gregory T. Reichl, Kaukana, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/199,261

(22) Filed: May 18, 2023

(65) Prior Publication Data

US 2023/0297054 A1 Sep. 21, 2023

Related U.S. Application Data

(63) Continuation of application No. 17/208,553, filed on Mar. 22, 2021, now Pat. No. 11,656,591.

(60) Provisional application No. 63/132,928, filed on Dec. 31, 2020.

(51) Int. Cl.
*G05B 19/042* (2006.01)
*G06F 8/61* (2018.01)

(52) U.S. Cl.
CPC ............ *G05B 19/042* (2013.01); *G06F 8/61* (2013.01); *G05B 2219/25011* (2013.01); *G05B 2219/2614* (2013.01)

(58) Field of Classification Search
None
See application file for complete search history.

(56) References Cited

U.S. PATENT DOCUMENTS

| | | | |
|---|---|---|---|
| 2011/0071685 A1 | 3/2011 | Huneycutt et al. | |
| 2016/0095192 A1* | 3/2016 | Vangeel | G05B 19/04 315/153 |
| 2018/0224819 A1* | 8/2018 | Noboa | G05B 19/0423 |
| 2018/0262573 A1* | 9/2018 | Przybylski | G06F 11/3058 |
| 2019/0094827 A1* | 3/2019 | Park | G05B 15/02 |

(Continued)

*Primary Examiner* — Philip Wang
(74) *Attorney, Agent, or Firm* — Foley & Lardner LLP

(57) ABSTRACT

A system for virtual commissioning of a building management system includes one or more memory devices configured to store instructions that, when executed by one or more processors, cause the one or more processors to: receive, at a virtual server, product installation data from a building management system controller installed at a building site via a first connection, the product installation data corresponding to a product installation at the building site; receive, commissioning data from the remote commissioning system via a second connection; configure one or more products installed at the building site to be controlled by the virtual building management system on the virtual server; and selectively transfer control of the one or more products installed at the building site from the virtual building management system hosted at on the virtual server to the building management system controller installed at the building site.

17 Claims, 10 Drawing Sheets

(56) References Cited

U.S. PATENT DOCUMENTS

| | | | |
|---|---|---|---|
| 2019/0302717 A1* | 10/2019 | Pelton | G05B 19/042 |
| 2019/0386977 A1* | 12/2019 | Shah | G06F 8/65 |
| 2020/0003448 A1* | 1/2020 | Schwegler | F24F 11/39 |
| 2022/0206445 A1* | 6/2022 | Reichl | G05B 15/02 |

* cited by examiner

SYSTEMS AND METHODS FOR VIRTUAL COMMISSIONING OF BUILDING MANAGEMENT SYSTEMS

CROSS-REFERENCE TO RELATED PATENT APPLICATIONS

This application is a continuation of U.S. patent application Ser. No. 17/208,553, filed Mar. 22, 2021, which claims the benefit of and priority to U.S. Provisional Application No. 63/132,928, filed Dec. 31, 2020, both of which are incorporated herein by reference in its entirety.

BACKGROUND

The present disclosure relates generally to building management systems. The present disclosure relates more particularly to virtual commissioning of a building management system.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

SUMMARY

One implementation of the present disclosure is method for virtually commissioning a building management system comprising installing a virtual building management system on a virtual server, wherein the virtual server is communicatively connected to a building management system controller installed at a building site via a first connection and communicatively connected to a remote commissioning system via a second connection; receiving, at the virtual server, product installation data from the building management system controller installed at the building site via the first connection, wherein the product installation data corresponds to a product installation at the building site; receiving, at the virtual server, commissioning data from the remote commissioning system via the second connection; configuring the one or more products installed at the building site to be controlled by the virtual building management system on the virtual server; and selectively transferring control of the one or more products installed at the building site from the virtual building management system hosted at on the virtual server to the building management system controller installed at the building site.

In some embodiments, product installation data from the building management system comprises configuration, status, state, connectivity, self-test, and operational data of one or more building equipment products installed at the building site.

In some embodiments, product installation data from the building management system is provided to the virtual server on a real time or near real time basis.

In some embodiments, commissioning data from the remote commissioning system comprises one or more of a configuration, an application, a command, a test procedure, a control strategy, a validation procedure, and operational instruction.

In some embodiments, the first connection and the second connection are secure connections.

In some embodiments, the first connection and the second connection are virtual private network connections.

In some embodiments, the building management system controller is configured with a network automation engine.

In some embodiments, the selectively transferring control of the one or more products installed at the building site comprises retaining control of the one or more products installed at the building site by the virtual building management system on the virtual server.

In some embodiments, the selectively transferring control of the one or more products installed at the building site comprises replication of the virtual building management system on a building site server.

Another implementation of the present disclosure is a system for virtual commissioning of a building management system, the system comprising one or more memory devices configured to store instructions that, when executed by one or more processors, cause the one or more processors to receive, at the virtual server, product installation data from the building management system controller installed at the building site via the first connection, wherein the product installation data corresponds to a product installation at the building site; receive, at the virtual server, commissioning data from the remote commissioning system via the second connection; configure the one or more products installed at the building site to be controlled by the virtual building management system on the virtual server; and selectively transfer control of the one or more products installed at the building site from the virtual building management system hosted at on the virtual server to the building management system controller installed at the building site.

In some embodiments, the product installation data from the building management system at the building site comprises identification, configuration, status, state, connectivity, self-test, and operational data of one or more building equipment products installed at the building site In some embodiments, product installation data from the building management system at the building site is provided to the virtual server on a real time or near real time basis.

In some embodiments, commissioning data from the remote commissioning system comprises one or more of a configuration, an application, a command, a test procedure, a control strategy, a validation procedure, and operational instruction.

In some embodiments, the first connection and the second connection are secure connections.

In some embodiments, the first connection and the second connection are virtual private network connections.

In some embodiments, the building management system controller is configured with a network automation engine.

In some embodiments, the selectively transfer control of the one or more products installed at the building site comprises retaining control of the one or more products installed at the building site by the virtual building management system on the virtual server.

In some embodiments, the selectively transferring control of the one or more products installed at the building site comprises replication of the virtual building management system on a building site server.

Another embodiment of the present disclosure is a system for virtual commissioning of a building management system, the system comprising a virtual server communicatively connected to a network automation engine panel and a remote commissioning system; and a virtual building management system hosted on the virtual server, the virtual building management system comprising an application engine and a database, wherein the database stores real time data related to one or more products installed at a building site.

In some embodiments, the system is configured to selectively transfer control of the one or more products installed at the building site from the virtual building management system hosted on the virtual server to a building management system controller installed at the building site.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

The present disclosure includes systems and methods to virtually commission a building management system using a virtual server hosting a virtual building management system and communicatively connected to a building management system controller and connected building management products at a building site.

It is often advantageous to remotely commission a building management system to improve the efficiency of commissioning workflows, reduce on site labor required to accomplish commissioning tasks, and to complete commissioning tasks when a building site is not physically accessible. Accordingly, it is desirable to provide capabilities for remotely and securely commissioning of a building management system.

Building and Building Management System

Figure 1A:
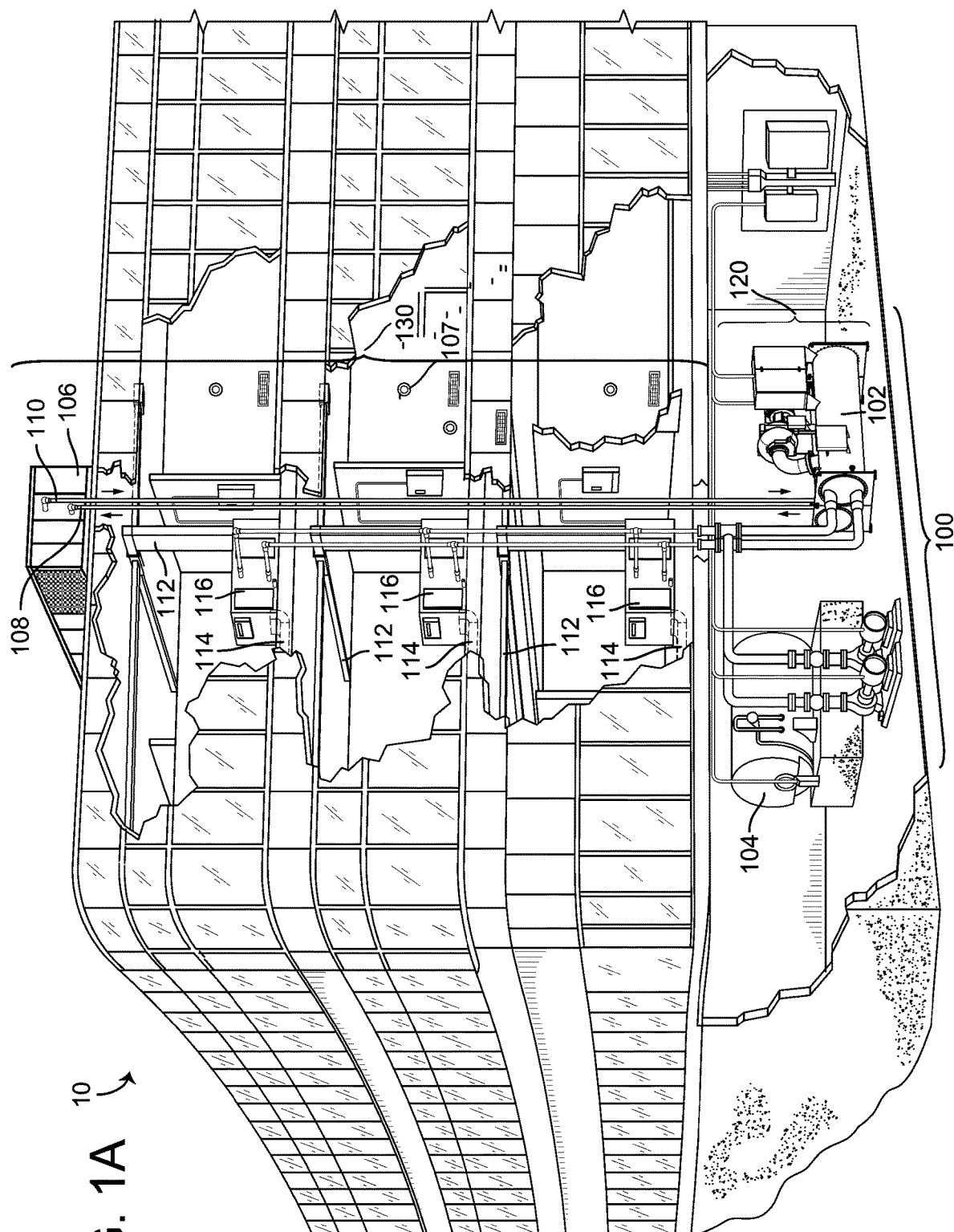
FIG. 1A is a drawing of a building equipped with a building management system (BMS), according to some embodiments.
Figure 1B:
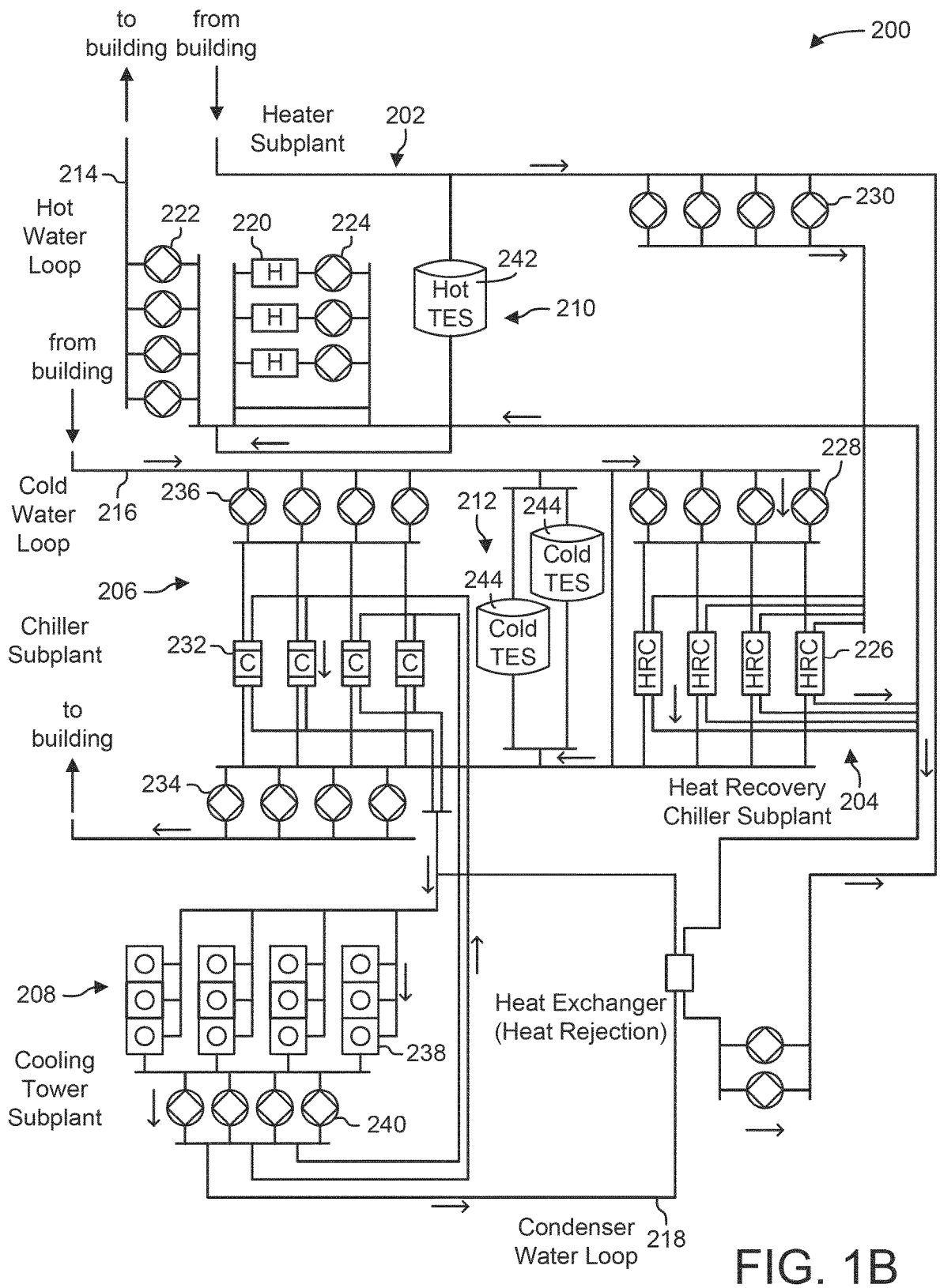
FIG. 1B is a block diagram of a waterside system which can be used to serve the building of FIG. 1, according to an exemplary embodiment.
Figure 1C:
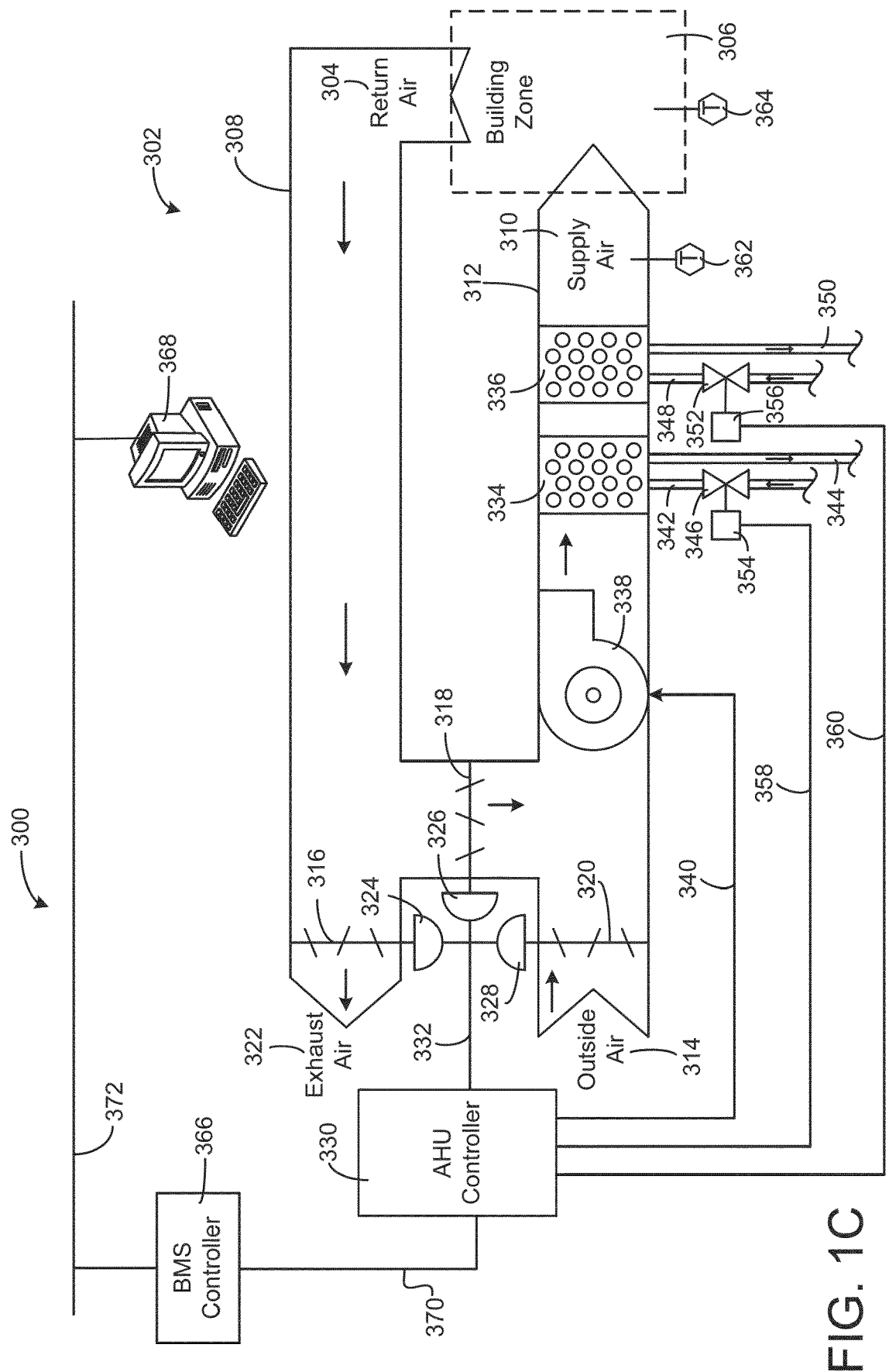
FIG. 1C is a block diagram of an airside system which can be used to serve the building of FIG. 1, according to an exemplary embodiment.
Figure 3:
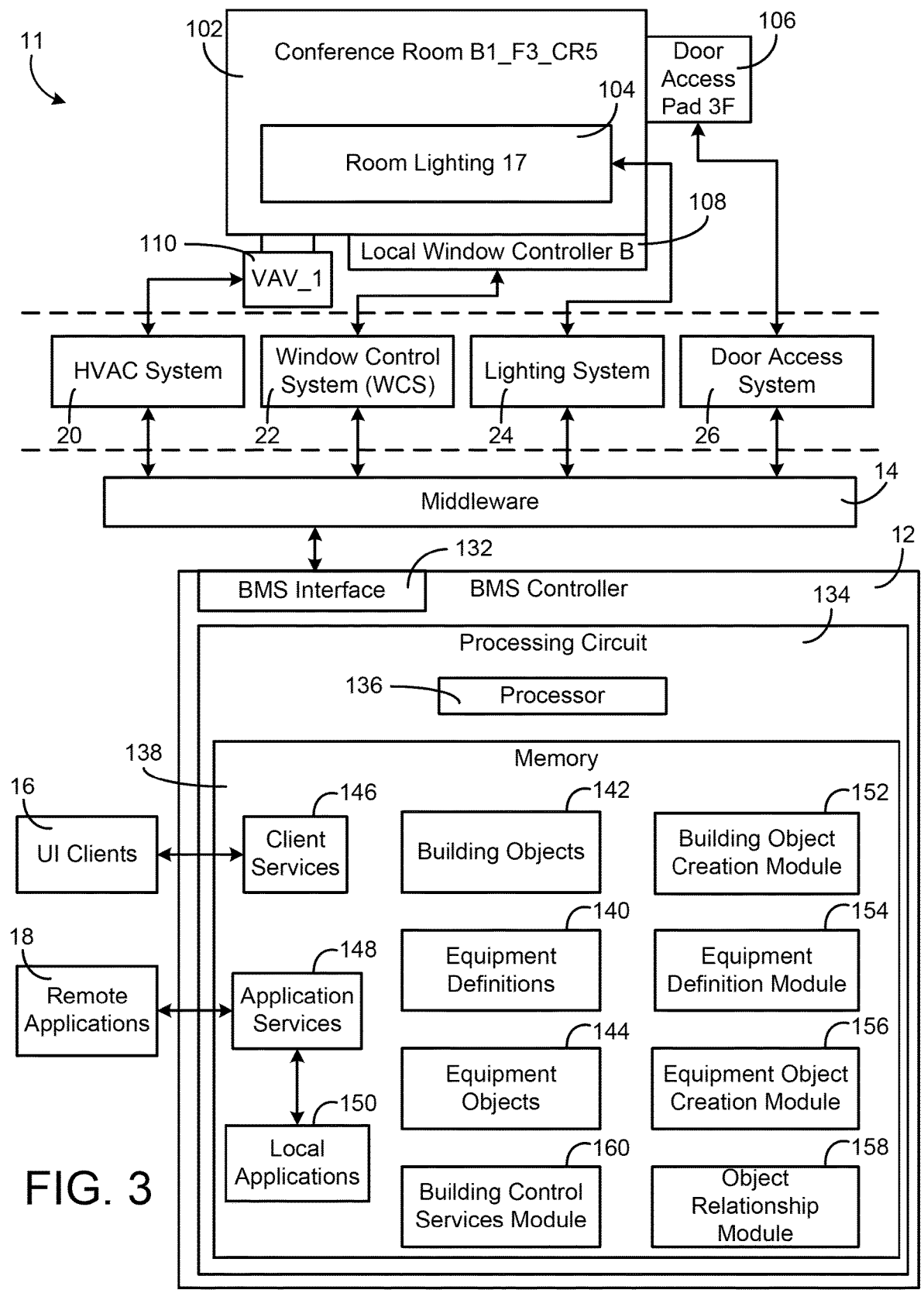
FIG. 3 is a block diagram of a BMS controller which can be used in the BMS of FIG. 2, according to some embodiments.
Figure 4:
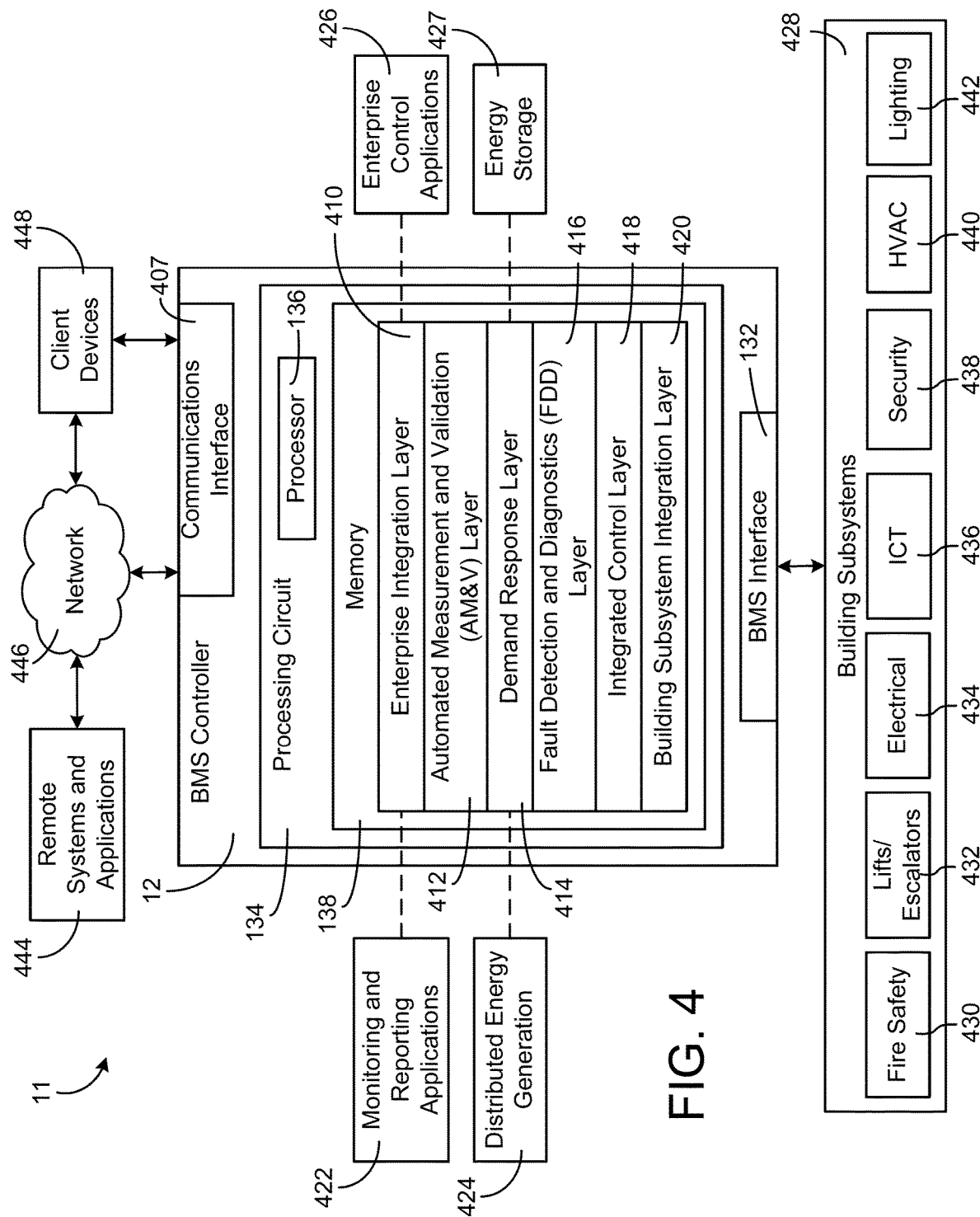
FIG. 4 is another block diagram of the BMS that serves the building of FIG. 1, according to some embodiments.

Referring now to FIG. 1A, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.). Referring now to FIGS. 1-7, several building management systems (BMS) and HVAC systems in which the systems and methods of the present disclosure can be implemented are shown, according to some embodiments. In brief overview, FIG. 1A shows a building 10 equipped with a HVAC system 100. FIG. 1B is a block diagram of a waterside system 200 which can be used to serve building 10. FIG. 1C is a block diagram of an airside system 300 which can be used to serve building 10. FIG. 3 is a block diagram of a BMS which can be used to monitor and control building 10. FIG. 4 is a block diagram of another BMS which can be used to monitor and control building 10.

Referring particularly to FIG. 1A, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1B) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

The BMS can include a thermostat 107 for controlling HVAC equipment in responses to temperature, humidity, air quality or other conditions. The thermostat 107 can be a smart thermostat with a user interface and internet and network connectivity. The thermostat 107 can include an occupancy sensor and can be in communication with a camera, such as an infrared or heat camera. In some embodiments, the thermostat 107 is in communication with or includes one or more of a variety of sensors (e.g., air quality, temperature, humidity, air quality, proximity, light, vibration, motion, optical, audio, occupancy, power, security, etc.) configured to sense a variable state or condition of the environment in which the thermostat 107 is installed. In an exemplary embodiment, the thermostat 107 is equipped with a monitoring device (e.g., a camera, a microphone, etc.) for monitoring physical disturbances in the environment where the thermostat 107 is installed. The camera may be a CMOS sensor, charge coupled device (CCD) sensor, or any other type of image sensor configured to monitor the environment. In some embodiments, the camera may be an infrared camera configured to detect infrared energy and convert it into a thermal image.

The sensors can include an air quality sensor (e.g., particulates, pathogen, carbon monoxide, carbon dioxide, allergens, smoke, etc.), a motion or occupancy sensor (e.g., a passive infrared sensor), a proximity sensor (e.g., a thermopile to detect the presence of a human and/or NFC, RFID, Bluetooth, sensors to detect the presence of a mobile device, etc.), an infrared sensor, a light sensor, a vibration sensor, or any other type of sensor configured to measure a variable state or condition of the environment in which the thermostat 107 is installed. The air quality sensor is configured to determine air quality (e.g., an amount of VOCs, CO, CO2, etc.) in some embodiments.

Waterside System

Referring now to FIG. 1B, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 1B, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 1C, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 1C, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1B) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 1C, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Figure 2:
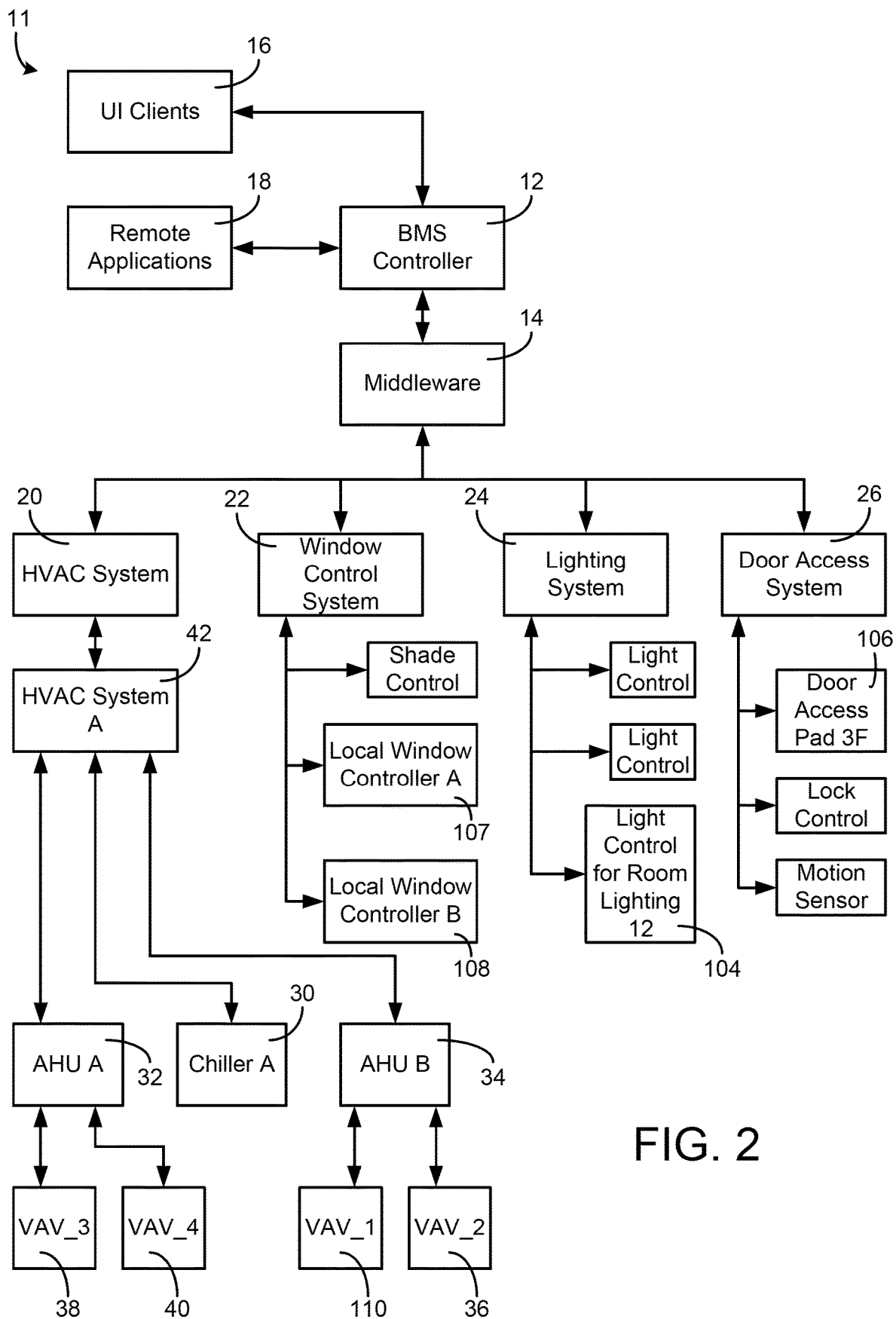
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

BMS 11 can be implemented in building 10 to automatically monitor and control various building functions. BMS 11 can be implemented using servers (e.g., cloud-based platform) or one or more thermostats (e.g., thermostat 107 FIG. 1A)). BMS 11 can be used with an information communication technology (ICT) subsystem, a security subsystem, a HVAC subsystem 440, a lighting subsystem, a lift/escalators subsystem, and a fire safety subsystem. In various embodiments, building subsystems 11 can include fewer, additional, or alternative subsystems. For example, building subsystems 11 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 1B-C.

Each of building subsystems 20-26 can include any number of devices, controllers, and connections for completing its individual functions and control activities. HVAC subsystem 440 can include many of the same components as HVAC system 100, as described with reference to FIGS. 1A-C. For example, HVAC subsystem 42 can include a chiller, a boiler, any number of air handling units, economizers, field controllers, supervisory controllers, actuators, temperature sensors, thermostats, and other devices for controlling the temperature, humidity, airflow, or other variable conditions within building 10. The lighting subsystem can include any number of light fixtures, ballasts, lighting sensors, dimmers, or other devices configured to controllably adjust the amount of light provided to a building space. The security subsystem can include occupancy sensors, video surveillance cameras, digital video recorders, video processing servers, intrusion detection devices, access control devices and servers, or other security-related devices.

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18.SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Virtual Commissioning of Building Management Systems

Figure 5:
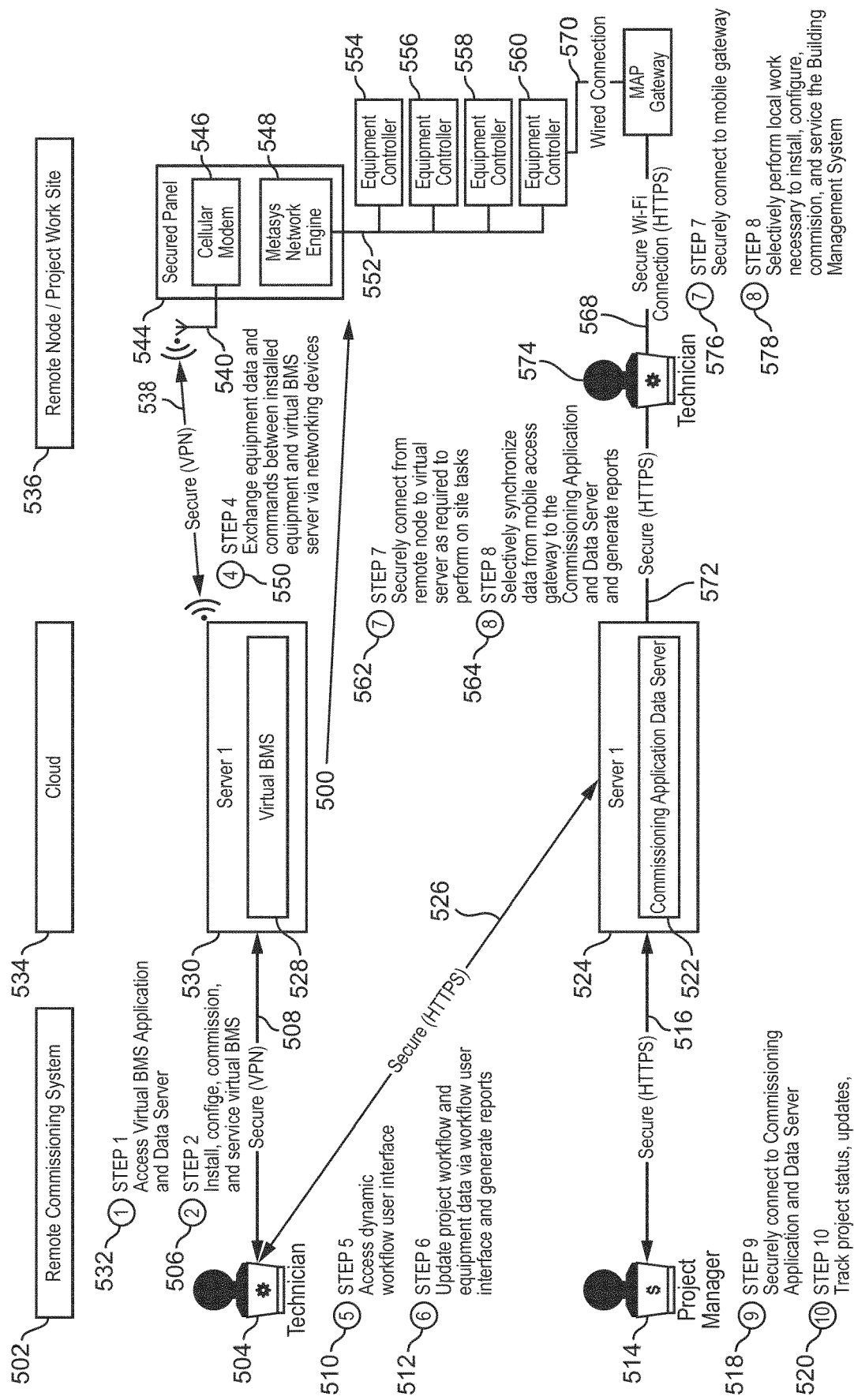
FIG. 5 is a block diagram of a system for virtual commissioning of a building management system.
Figure 6:
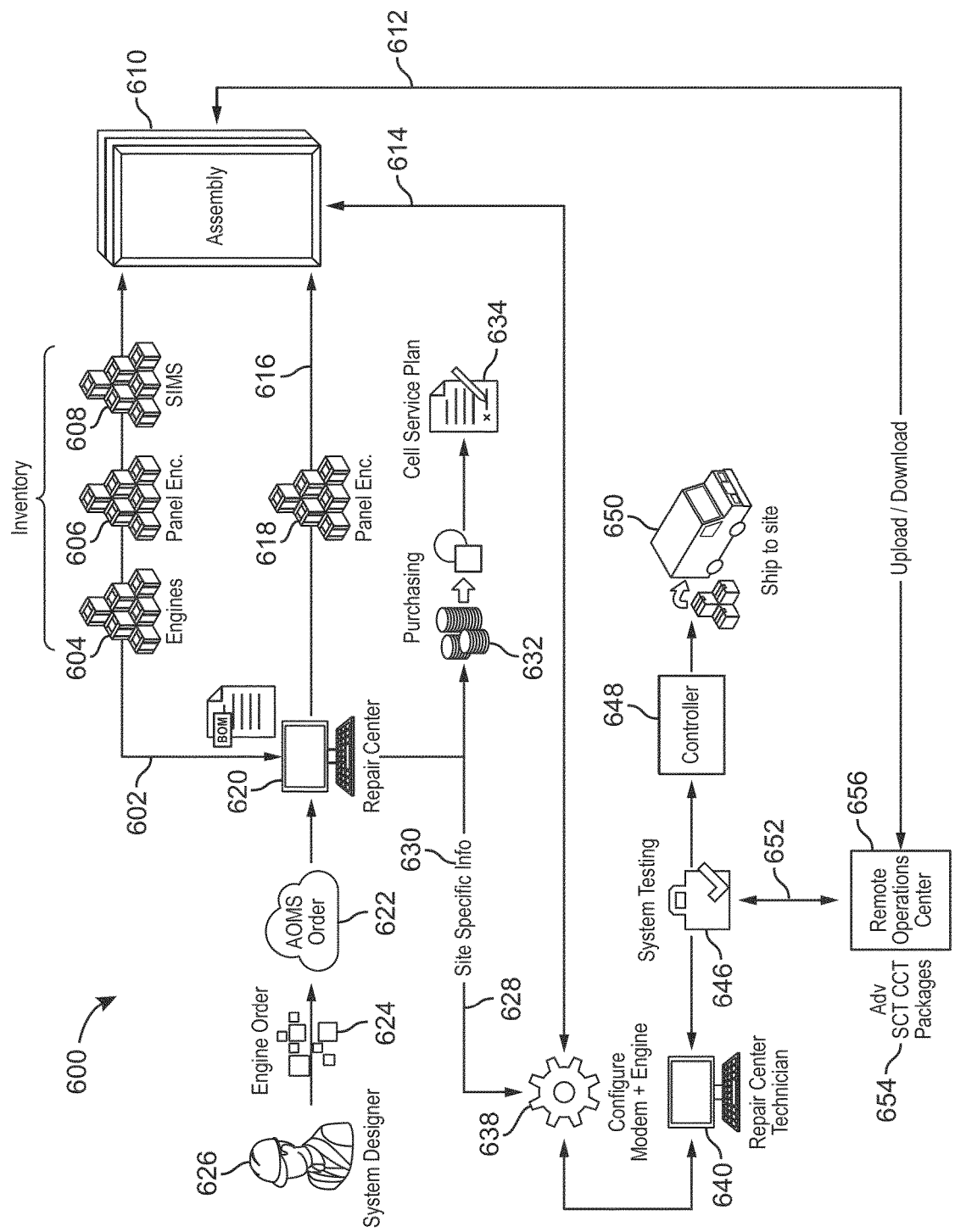
FIG. 6 is a process flow diagram for a system for producing a building management system controller for a system for virtual commissioning of a building management system.
Figure 7:
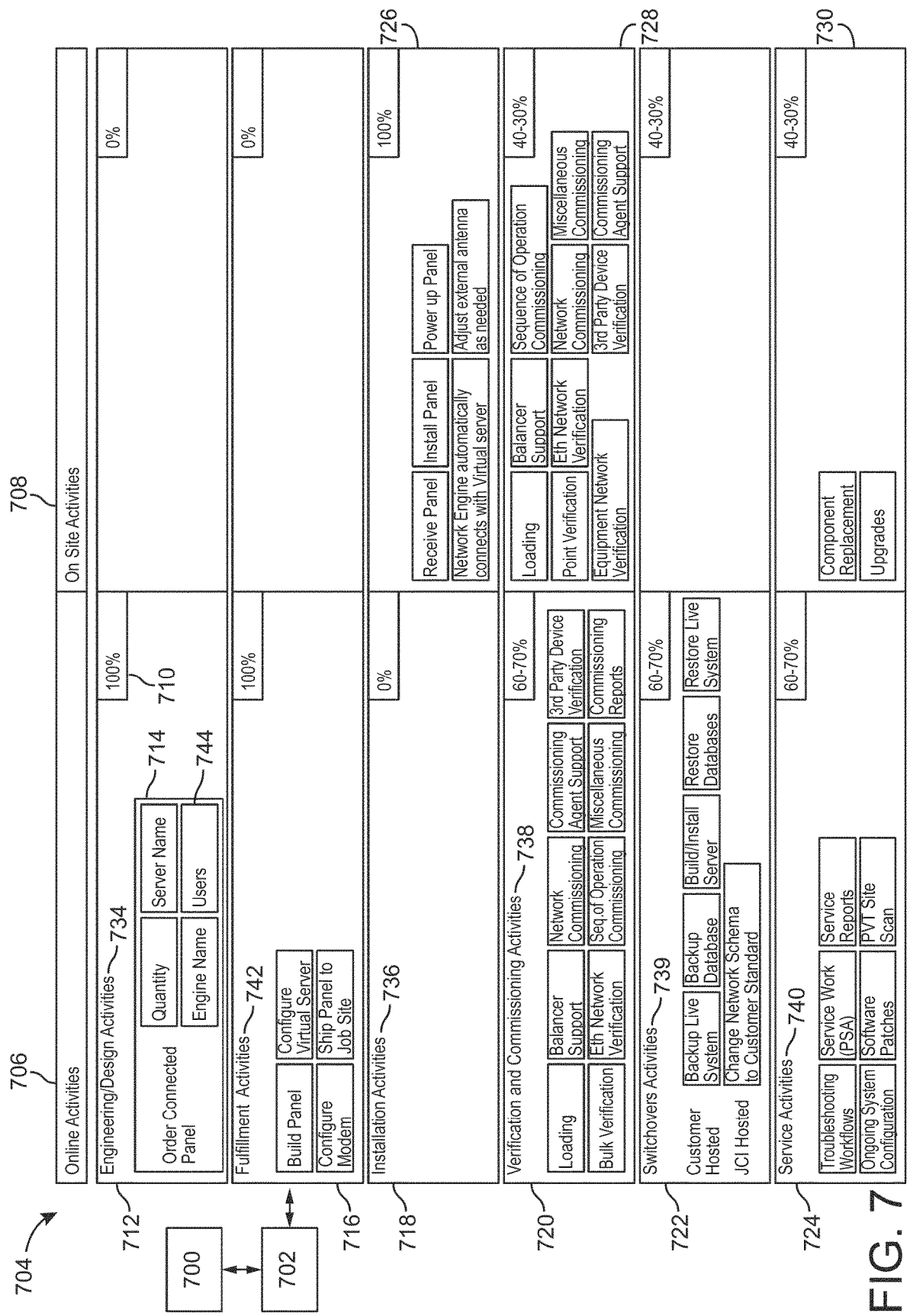
FIG. 7 is a drawing of a graphic user interface for a system for virtual commissioning of a building management system.

Referring now to FIGS. 5-7, systems and methods for virtual commissioning of a building management system (BMS) are shown, according to some embodiments. In some embodiments, an "entity" may refer to any unit within a BMS that corresponds to data. In some embodiments, for example, entities may include spaces, equipment, sensors, devices, and points.

Referring to FIG. 5, in some embodiments of the present disclosure, a system for virtual commissioning of a BMS 500 is configured to manage installation, configuration, and commissioning of connected buildings and building management products therein. Additionally, in some embodiments the system for virtual commissioning of a BMS 500 is configured to allow a remote commissioning system 502 to exchange data via a connection 508 with a virtual server 530 hosting a virtual BMS services 528. The data may comprise, for example, data related to design, configuration, commissioning, installation, status, function, and operation of a connected building, a BMS system, BMS equipment, BMS products, etc. In some examples, the virtual BMS services 528 may be a virtual application and data system. The remote commissioning system 502 can include Metasys tools such as system configuration tools (SCT) and/or controller configuration tools (CCT) in some embodiments. The virtual server 530 may be a cloud hosted 534, or hosted on another application and data server host. In some embodiments, the virtual BMS server 530 (and all virtual BMS servers) are centrally hosted in a provider data center and not on a user side. In some examples, the virtual server 530 is communicatively connected via the connection 508 with the remote commissioning system 502. The virtual server 530 is also connected via a connection 538 with a building management system controller 544 at a building site 536. The connections 508, 538 may be communications connections (e.g. cellular), or other forms of connectivity. The connections 508, 538 are cellular virtual private network (VPN) connections or other secure network or communications connections. The connections 508, 538 between the virtual server and other elements of the system for virtual commissioning of a BMS 500 may include any type of network connection and are not necessarily separate or dedicated links between elements of the system for virtual commissioning of a BMS 500. Commissioning the BMS 500 over remote connectivity via cellular and VPN connections (e.g., via connections 508 and 538) provides significant advantages.

In some examples, the remote commissioning system 502 may comprise one or more users 504, 514, user interface and input devices (e.g., computer terminals, client devices, user devices, etc.) or other data input devices (e.g. BMS interfaces). The remote commissioning system 502 may provide user access to virtual servers 530, 524 that host virtual BMS or virtual commissioning application and data services 522. Services provided by the remote commissioning system 502 may include access to virtual services 532, 510, provisions for users to install, configure, commission, and service virtual BMS installations 506, services to update project workflow and equipment data via workflow user interface and generate reports 512, services to securely connect 518 to commissioning application and data servers 524 and services 522, and services to track project status, updates schedules and financial forecasts 520. In some embodiments, remote commissioning system 502 is installed on the same server 530 or 524 of the commissioning application and data services 522 or virtual BMS services 528, respectively.

In some examples, the system for virtual commissioning of a BMS 500 may comprise one or more cloud hosted 534 services. Cloud hosted 534 services may include remote servers 530, 524, virtual BMS services 528, and commissioning application and data servers 524 and services 522. Cloud hosted 534 service may be connected to other elements of the virtual commissioning of a BMS 500 by appropriate network and communications means including secure VPN (e.g., connections) 508, 526 and secure HTTPS (e.g., connection 516), or wireless communications (e.g. cellular, WiFi) 540, 568.

In some examples, the virtual server 530 hosts the virtual BMS services 528. The virtual server 530 allows a user 504 to build up a functional BMS data base and BMS user interface in a virtual environment. The virtual server 530 is communicatively connected via connection 538 to connected building components 540, 544, 548, 554, 556, 558, 560, 580. The virtual server 530 dynamically exchanges data with the connected building components 540, 544, 548, 554, 556, 558,560, 580 to populate BMS databases within the virtual BMS services 528 and update workflow tracking applications. The exchanged data includes commissioning data and product and equipment installation data, configuration data, test data, and functional data.

The virtual server 530 also provides services to generate user interfaces to accept inputs from user 504 relating to commissioning and operation of connected building components 540, 544, 548, 554, 556, 558,560, 580 installed at a building site. In some examples, the virtual BMS services 528 including its data base and all its components may be exported and put into a host system in a production environment or in a building site. The host system in the production environment or in a building site may be, for example a construction panel 544 (e.g., secured). In other examples, the virtual BMS services 528 may remain hosted in a remote environment and control connected building components 540, 544, 548, 554, 556, 558,560, 580 remotely following commissioning of the BMS system. The virtual server 530 can be named and configured to mimic exactly the interfaces provided and functions performed by production hosting the construction panel 544 at a building site 536. Advantageously, the system for virtual commissioning of a BMS 500 configured with the remote server 530 with live connection 538 to connected building components 540, 544, 548, 554, 556, 558,560, 580 at the building site via connection 538 enables commissioning of the virtual server before building construction/installation is complete. Remote BMS commissioning via the virtual server 530 provide advantages in reducing or eliminating the need for on site commissioning of a BMS, permitting BMS commissioning work to continue when a building site is not physically accessible to a user 504, and significantly reducing the time need to activate live control of connected building components 540, 544, 548, 554, 556, 558,560, 580 at the building site via connection 538 by the BMS at the completion of building construction and component installation.

In other examples, the system for virtual commissioning of a BMS 500 configured with the remote server 530 with live connection 538 to the building site 536 provides further advantages by providing for selective transfer of control of connected building components 540, 544, 548, 554, 556, 558,560, 580 at the building site via connection 538 from the virtual BMS services 528 hosted on the remote server to a duplicate of the virtual BMS services 528 hosted on the building management system controller 533 installed at the building site via connection 538. This flexibility enables a user to elect to continue to use the virtual BMS services 528 hosted on the virtual server 530 to control connected building components 540, 544, 548, 554, 556, 558,560, 580 following commissioning of building management system or to configure the virtual BMS services 528 hosted on the virtual server 530 as a back up to a primary BMS at the building site 536.

In some embodiments of the present disclosure, the system for virtual commissioning of a BMS 500 is configured with connected building components 540, 544, 548, 554, 556, 558,560, 580 at a remote site 536 via connection 538. The remote site may be, for example, a building site, a construction project, a renovation project, etc. The system for virtual commissioning of a BMS 500 may connect with connected building components 540, 544, 548, 554, 556, 558, 560, 580 via networks or communications channels. Building site 536 networks or communications channels may be temporary wired or wireless connections.

In some embodiments of the present disclosure, the system for virtual commissioning of a BMS 500 is configured with a building management system controller or the construction panel 544 at a building site 536. The construction panel 544 may be, for example, a secured panel. The construction panel 544 may be configured with external communications interfaces, communications modems 546, network automation engines 548 (e.g., a Metasys network engine), internal communications interfaces, and connections to controlled equipment 552.

In some embodiments of the present disclosure, the system for virtual commissioning of a BMS 500 may be further configured with mobile access point gateways 580, secure mobile device connections 568, 572, field technician users 574, additional virtual servers 524 hosting commissioning applications and data bases and other services 522, project management users 514, and user interfaces to receive user inputs and display information generated by the system.

Referring now to FIG. 6, in some embodiments, the system for virtual commissioning of a BMS 500 may include systems, processes, and methods for a BMS controller production system 600. In some examples, the production system 600 may produce or configure a building management system controller 648 configured to operate as a component of the system for virtual commissioning of a BMS 500. The BMS controller production system 600 may comprise, for example a user with user interface device 626. The user 626 may create a BMS network engine order 624. The BMS network engine order may generate a sensor order 622. The combined BMS network engine order and sensor order may generate a production enterprise resource planning (ERP) file 658 within an ERP system (620). The production ERP file 658 may include a bill of materials. The production ERP file 658 may provide instruction for the assembly 610 of components 604, 606, 608, 618 into the BMS controller 648. Components of the BMS controller may include, for example, an automation engine 604, a panel enclosure, a secure connectivity/identity module 608, and a modem 618. Data relating to configuration of a BMS and BMS equipment at a specific building site 630 may be provided by the system for virtual commissioning of a BMS 500 to the BMS controller production system 600 for configuration of the BMS controller 648.

In some examples, the production system 600 may comprise additional steps or processes including purchasing action 632 related to communications service 634 to enable connectivity between the BMS controller 648 and the system for virtual commissioning of a BMS 500, testing 646 of the BMS controller 648, additional testing and configuration 654 of the BMS controller 648 in a virtual BMS environment, and installation of the production BMS controller 648 at a building site 650.

BMS Commissioning on an Application

Referring now to FIGS. 5 and 7, systems and methods for a BMS commissioning on an application (CAP) system are shown, according to some embodiments. In some embodiments, an "entity" or a "unit" may refer to any unit within a BMS that corresponds to data. In some embodiments, for example, entities or units may include spaces, equipment, sensors, devices, and points.

Referring to FIG. 5, a BMS CAP application and database services 522 is hosted on a server 524. The server 524, in some examples, is a virtual server. The server 524 is be communicatively connected via connections 516, 526, 572 to processors and user interfaces. The processors and user interfaces, in some examples, comprise entities within a BMS virtual commissioning system. Users (e.g. design users 504, project management users 514, and service technician users 574) access the CAP system through a user interface. User inputs are received and system information generated by the CAP system is displayed information via the user interface.

Referring now to FIG. 7, in some embodiments of the present disclosure, a BMS CAP system 700 is configured to generate a user interface 704 on a user device 702. The user interface 704 provides one or more views comprising a CAP dashboard view 704. The CAP dashboard view 704 presents, for example, a graphic representation of the status 710 of BMS commissioning workflow activities 712-730.

In some examples, the CAP dashboard view 704 displays a digitized representation of a BMS commissioning workflow. The framework of the BMS commissioning workflow and workflow activities 712-730 within the framework presented in the CAP dashboard view 704 may, in some examples, be generated by an application hosted on a server. The application generating the framework of the BMS commissioning and workflow activities 712-730 within the framework presented in the CAP dashboard view may comprise a CAP application or other BMS application.

The CAP dashboard view 704, in some examples, presents project management data, building site data, construction site data, or customer data collected via a BMS network at a building site or through other BMS data collection tools (e.g. a mobile device access point gateway, a data logger, a technician's mobile device, etc.) and formats data into workflow activities 712-730. The data received by the server hosting the CAP application is stored in a database. The database may be, for example, an active directory database. In some examples, data received by the server hosting the CAP application may be real time or near real time data comprising BMS equipment configuration, status, installation state, and operation.

In other examples, the CAP dashboard view 704 comprises depictions of commissioning activities 712-730. Depiction of commissioning activities are organized according to online activities 706 and on site activities 708 in some examples. Commissioning activities may be classified and displayed according to function in some implementations. Functions within the CAP dashboard view 704 may include for example, engineering/design 734, fulfillment 742, installation 736, verification and commissioning 738, switchover 739, and service 740. The CAP dashboard view 704 may display, in some implementations, one or more tasks 714 (e.g. order connected panel). In some examples, the one or more tasks 714 may comprise information related to a bill of materials, a schedule, an information repository, a user, a schedule, etc. Tasks displayed in the CAP dashboard, in some examples, are further decomposed into sub-tasks. In some implementations, tasks 714 displayed in the CAP dashboard view 704 may correspond to a work breakdown structure.

In other implementations, the CAP dashboard view 704 presents views comprising a punch list track system that identifies defects requiring correction at a building site; annotations of design documents, images of building site activity, progressive images of workflow activity completion, etc.

In some examples, the CAP dashboard presents an activity completion status 710. The activity completion status 714 is, in some implementations, a percentage. The activity completion status 714 reflects, in some implementations, a completion of activities based on a commissioning workflow baseline.

In some examples, activities, tasks, and status indication presented in the CAP dashboard view 704 are rendered in one or more formats according to instructions in the CAP application. The one or more formats may comprise, for example, highlighting, color coding, modified text, etc. Formats, in some examples, indicate a variance of activities, tasks, and status from the commissioning workflow baseline.

In some examples, the CAP dashboard view 704 is formatted for presentation on a user device (e.g. a phone, a tablet, a laptop, a personal computer). In other examples, the CAP dashboard view 704 is provided as a selectable view in a BMS user interface. In some examples, the CPA dashboard view 704 presents one or more interaction elements for user inputs to the CAP system. In some embodiments, the CAP dashboard view provides user selectable links to collateral information related to BMS commissioning workflow activities. For example, a field technician may view on a user device a detailed procedural checklist for a commissioning workflow activity presented on the CAP dashboard by interacting with a graphical user interface control element associated with CAP dashboard commissioning workflow activity.

In some examples, the CAP system archives all data, views, and inputs processed through the system in the system database. Archived CAP system information is available for generation of reports and records related to the commissioning workflow comprising, for example, system documentation, milestone reports, completion reports, billing documents, performance reports, schedules, change orders, etc.

In some examples, an automated action is initiated based on a commissioning activity status of the commissioning activities defined by the building management system commissioning workflow application. The automated action is an output from the application server to a building management system product connected to the building management system CAP system. The automated action comprises, for example, a command, an alert, a status update, a BMS control command, a notification, an operational instruction to a device, an instruction to generate a report, an activation of a link to collateral information relevant to a commissioning workflow activity, etc. In some examples the automated action initiated by the building management system commissioning workflow application may comprise a series or sequence of actions. The automated action may, for example, comprise a test procedure, an HVAC balance procedure, and a commissioning milestone report. In some examples, the automated action initiated by the building management system commissioning workflow application is triggered by a user input. For example, a user provides an input through the user interface displayed on a user device to initiate an automatic switchover of BMS control from a virtual BMS hosted on a virtual server to a BMS hosted on a server at the building site.

Figure 8:
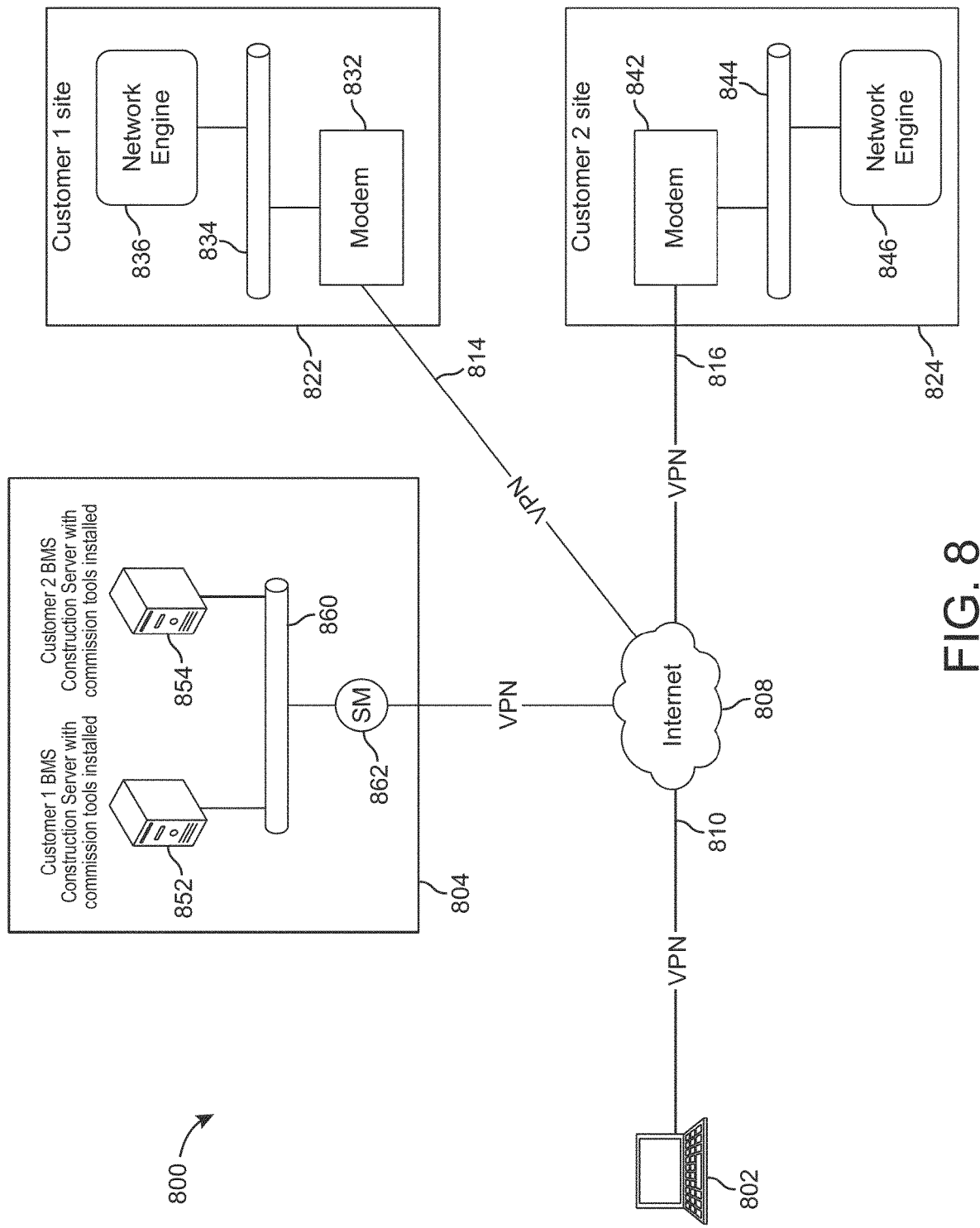
FIG. 8 is a block diagram of a system for virtual commissioning of two or more building management systems.

With reference to FIG. 8, systems and methods for a BMS commissioning on an application (CAP) system are shown, according to some embodiments. The system is 800 similar to the systems discussed with reference to FIGS. 5-7 and includes a technician lap top 802, a set of virtual servers 804, a customer site 822, and a customer site 824 in some embodiments. The technician laptop 802 can be remotely communicatively coupled via VPNS 810 and 812 and internet 808. The set of virtual servers 804 are hosted on a provider data center or cloud remote for the customer sites 822 and 824. The customer BMS construction server 852 and customer BMS construction server 854 in the set of virtual servers 804 having commissioning tools installed in some embodiments. The customer BMS construction server 852 and customer BMS construction server 854 are coupled to a LAN 860. LAN 860 is coupled to a security appliance 862 (e.g., a Meraki security appliance) in communication with the VPN 812.

The customer site 822 includes a cellular modem 832, a LAN 834 and a network engine 836. The customer site 822 is communicatively coupled via a VPN 814 to the internet 808. The customer site 824 includes a cellular modem 842, a LAN 844 and a network engine 846. The customer site 824 is communicatively coupled via a VPN 816 to the internet 808.

Advantageously, the system 800 supports a remote commission method that does not require all devices (BMS server, Network Engines, controllers) be located on premise interconnected on the same LAN. In some embodiments, the remote commission method used by the system 800 allows these devices to be located in separate geographical regions interconnected over VPN connections such as VPNs 810, 814, and 816.

In some embodiments, technicians are able to login to the BMS commission tools which are installed on the centrally hosted virtual BMS construction servers 852 and 854 either when they are connected to a provider network (not shown on this diagram) or when they are on the VPN 810. In some embodiments, all or nearly all of the BMS commissioning tasks are performed on or originated from the centrally hosted virtual BMS construction servers 852 and 854. Once the BMS system commissioning is completed, the devices located at the customer sites 822 an 824 such as the network engines 826 and 846 and controllers can be commanded/controlled by the centrally hosted construction servers 852 and 854 over the VPNs 814 and 816. The customer can decide if the construction server database should be downloaded/merged onto a server installed locally at the customer's site 822 and 824 and/or can choose to continue running their BMS system using the construction servers 852 and 854 as the permanent production BMS servers.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for virtually commissioning a building management system comprising:
    installing a virtual building management system on a virtual server, wherein the virtual server is communicatively connected to a building management system controller installed at a building site;
    receiving, at the virtual server, product installation data, wherein the product installation data corresponds to one or more products at the building site;
    configuring the one or more products installed at the building site to be controlled by the virtual building management system on the virtual server; and
    selectively transferring control of the one or more products installed at the building site from the virtual building management system hosted by the virtual server to the building management system controller installed at the building site and from the building management system controller at the building site to the virtual building management system hosted on the virtual server.

2. The method of claim 1, further comprising:
    receiving, at the virtual server, the product installation data from the building management system controller installed at the building site a first connection, wherein the product installation data corresponds to a product installation at the building site, wherein the product installation data from the building management system comprises configuration, status, state, connectivity, self-test, and operational data of one or more building equipment products installed at the building site.

3. The method of claim 2, wherein the product installation data from the building management system is provided to the virtual server on a real time or near real time basis.

4. The method of claim 2, further comprising:
    receiving, at the virtual server, commissioning data from a remote commissioning system via a second connection, wherein the commissioning data from the remote commissioning system comprises one or more of a configuration, an application, a command, a test procedure, a control strategy, a validation procedure, and operational instruction.

5. The method of claim 2, wherein the first connection is a secure connection.

6. The method of claim 2, wherein the first connection is a virtual private network connection.

7. The method of claim 2, wherein the building management system controller is configured with a network automation engine.

8. The method of claim 1, wherein the selectively transferring control of the one or more products installed at the building site comprises retaining control of the one or more products installed at the building site by the virtual building management system on the virtual server.

9. The method of claim 1, wherein the selectively transferring control of the one or more products installed at the building site comprises replication of the virtual building management system on a building site server.

10. A system for virtual commissioning of a building management system, the system comprising one or more memory devices configured to store instructions that, when executed by one or more processors, cause the one or more processors to:
    receive, at a virtual server, product installation data from a building management system controller installed at a building site via a first connection, wherein the product installation data corresponds to a product installation comprising one or more products at the building site;
    configure the one or more products installed at the building site to be controlled by a virtual building management system on the virtual server; and
    selectively transfer control of the one or more products installed at the building site from the virtual building management system hosted on the virtual server to the building management system controller installed at the building site and from the building management system controller at the building site to the virtual building management system hosted on the virtual server.

11. The system of claim 10, wherein the product installation data from the building management system at the building site comprises identification, configuration, status, state, connectivity, self-test, and operational data for one or more building systems.

12. The system of claim 10, wherein the product installation data from the building management system at the building site is provided to the virtual server on a real time or near real time basis.

13. The system of claim 10, where in the instructions are configured to receive, at the virtual server, commissioning data from a remote commissioning system, wherein the commissioning data from the remote commissioning system comprises one or more of a configuration, an application, a command, a test procedure, a control strategy, a validation procedure, and operational instruction.

14. The system of claim 10, wherein the first connection is secure connection or a virtual private network connection.

15. The system of claim 10, wherein the building management system controller is configured with a network automation engine.

16. The system of claim 10, wherein the selectively transfer control of the one or more products installed at the building site comprises retaining control of the one or more products installed at the building site by the virtual building management system on the virtual server.

17. The system of claim 10, wherein selectively transferring control of the one or more products installed at the building site comprises replication of the virtual building management system on a building site server.

* * * * *